United States Patent [19]

Cook

[11] 4,176,065
[45] Nov. 27, 1979

[54] MAGNETIC FILTER

[76] Inventor: Robert J. Cook, Clinton, Mo. 64735

[21] Appl. No.: 853,082

[22] Filed: Nov. 21, 1977

[51] Int. Cl.² ............................................. B01D 35/06
[52] U.S. Cl. ................................... 210/223; 55/100; 209/223 R
[58] Field of Search ......... 55/100; 209/223 A, 223 R, 209/224; 210/42 S, 172, 222, 223

[56] References Cited

U.S. PATENT DOCUMENTS

| | | | |
|---|---|---|---|
| 2,149,764 | 3/1939 | Frei | 210/223 |
| 2,789,655 | 4/1957 | Michael et al. | 210/223 X |
| 2,800,230 | 7/1957 | Thoma | 210/223 |
| 2,951,586 | 9/1960 | Moriya | 210/223 |
| 3,034,651 | 5/1962 | Morrell | 210/222 |
| 3,186,549 | 6/1965 | Botstiber | 210/222 X |
| 3,371,790 | 3/1968 | Kudlaty et al. | 210/223 |
| 3,923,660 | 12/1975 | Kottmeier | 210/222 |
| 3,951,807 | 4/1976 | Sanderson | 210/222 |
| 4,026,805 | 5/1977 | Fowler | 210/223 |
| 4,067,810 | 1/1978 | Sullivan | 209/224 X |

Primary Examiner—Robert H. Spitzer
Attorney, Agent, or Firm—Fishburn, Gold & Litman

[57] ABSTRACT

Clusters of elongated magnets are aligned in an end-to-end relationship to provide an elongated magnetic element that is insertable into the central cavity of an annular screen. A circulating stream of liquid, such as hydraulic fluid, is drawn through the screen and over the magnets for removal of ferreous particles or other magnetically attracted contaminants. The magnets of each cluster are arranged in a radial pattern around a common longitudinal axis and are retained in place by spacers located in intervals along the axis. The maximum width of the clusters is greater than the maximum width of the spacers with which the magnets of the clusters are abutted. Accordingly the edges of the magnets project radially outward from the spacers and are thus advantageously placed for contact with a surrounding annular screening element, and can be clustered closer together for more intense magnetic interaction between the poles of adjacent magnets without seriously impeding the flow of a liquid along the length of the element.

3 Claims, 5 Drawing Figures

MAGNETIC FILTER

BACKGROUND OF THE INVENTION

This invention pertains to apparatus employed for separation of particulate contaminants from liquids, and more particularly pertains to a magnetic element that can be used in combination with a screening element for removal of magnetically attracted particles from circulating liquids such as hydraulic fluids, engine oils, transmission fluids, power steering fluids, and the like.

In the operation of devices having moving parts of iron or steel, e.g. engines, transmissions, and hydraulic pumps, cylinders and motors, it is frequently necessary to continuously circulate a liquid through the device for lubrication or cooling, or for the transmission of pressure, force, or torque. There is a more or less gradual accumulation of particulate contaminants within the liquid, including flakes or iron, steel or rust that separate from surfaces of moving parts that are bathed by the liquid. Such detrimental ferreous contaminants must be separated, or else effectively immobilized against circulation within the liquid, in order to protect the moving parts of the device from excessive wear.

The use of barrier type filter elements for continuous removal of magnetically attracted contaminants from a circulating liquid is oftentimes unsuccessfull since the interstices of the barrier matrix clog too rapidly, thus requiring frequent cleaning or replacement of the element. As a consequence, attempts have been made to use magnets for trapping such contaminants, but magnets have not always proven effective for continuous filtering because of inadequate attraction of adherence of particles to the magnets and/or inadequate retention thereon following adherence.

SUMMARY OF THE INVENTION

It is therefore an object of this invention to provide an improved magnetic element for removal of magnetically attracted contaminants from fluids.

Another object is to provide an elongated magnetic element having a number of magnets arranged end-to-end in clusters whereby a liquid flows over and between the magnets while it travels along the length of the element.

Yet another object is to provide a magnetic element that can be inserted into the central cavity of an annular screening element for effective removal of magnetically attracted contaminants from a liquid that is continuously circulated through the screen.

Still another object is to provide an element with magnets having their poles aligned in a selected pattern for formation of an intense magnetic field that strongly attracts and binds ferreous particles thereto.

Even another object is to provide a readily servicable and easily cleanable magnetic element for removing magnetically attracted contaminants from liquids that are circulated within engines, motors, pumps, cylinders, transmissions and the like.

Other objects and advantages of the invention will become apparent from the following description, the drawings and the appended claims.

The present magnetic element is insertable into the central cavity of an annular screening element, whereby fine magnetically attracted particles are collected by the magnetic element after relatively coarser particles have been collected on the screening element. Clusters of elongated magnets are aligned in an end-to-end relationship on a common longitudinal axis, with the magnets of a cluster being spaced apart from each other, oriented axially in relation to the longitudinal axis, and located outwardly therefrom in a radial pattern. Spacers are located at intervals on the longitudinal axis, and the magnets of a cluster are abutted with at least one of the spacers and retentively engaged thereby, with the maximum width of the cluster being greater than the maximum width of a spacer with which the magnets of the cluster are abutted.

DESCRIPTION OF PREFERRED ALTERNATIVE EMBODIMENTS

Figure 1:
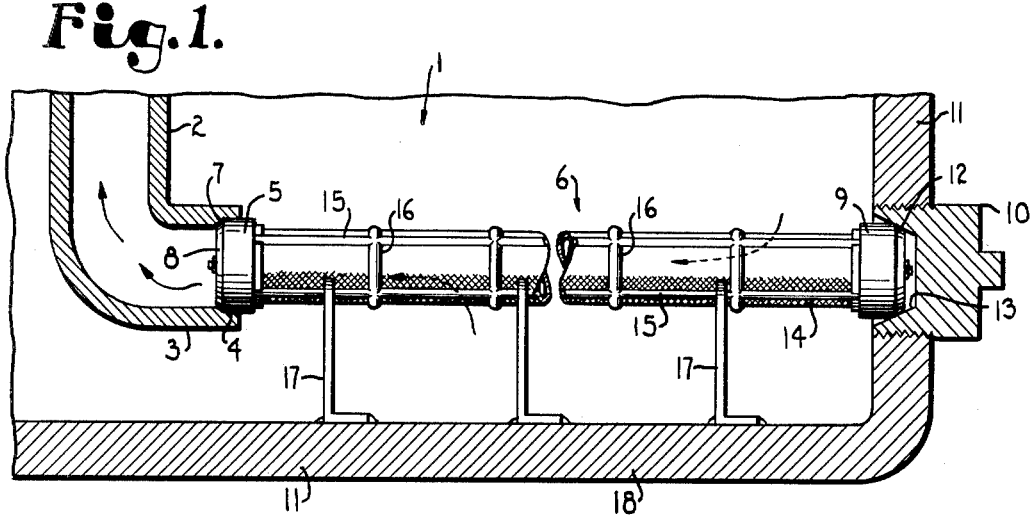
FIG. 1 is a fragmentary and partially sectional view, in elevation, of a sump for a circulating body of hydraulic fluid, the sump having a screening element therein for removal of particulate solids from the fluid.
Figure 2:
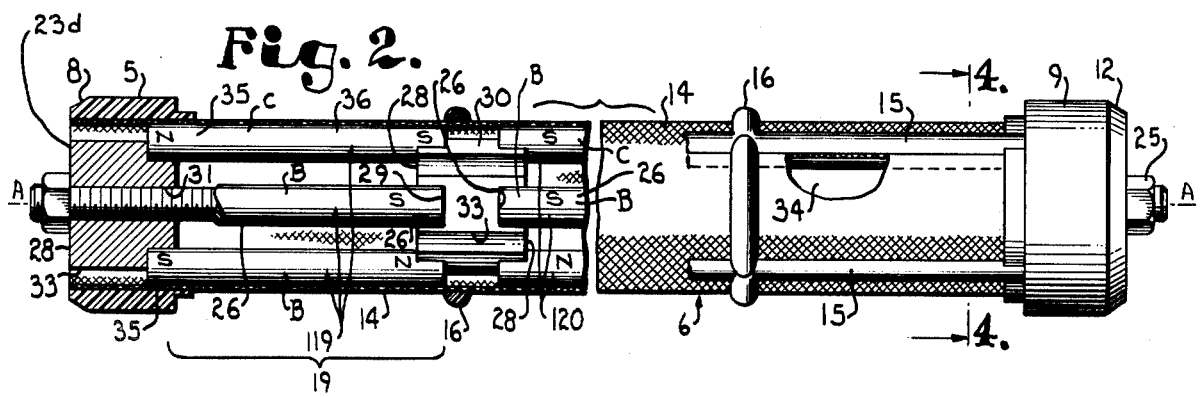
FIG. 2 is a fragmentary and partially sectional view, in elevation, of a magnetic filtering element that is constructed in accordance with the present invention, and is shown installed in the screening element of the sump that is illustrated in FIG. 1.

In FIG. 1, a sump 1 serves as a reservoir for a hydraulic fluid that is fed to hydraulic apparatus, (not shown) through a suction line 2. The inner end 3 of line 2 has a cylindrical bore 4 that receives a sealing ring 5 of the annular screening element 6. Bore 4 has a beveled shoulder 7 at the inner end that abuts a beveled shoulder 8 on the sealing ring. Both the shoulders 7 and 8 are beveled at the same angle and have the same diameter so as to effect a sealing fit between ring 5 and line 2. At the opposite end of the screening element 6 there is a second sealing ring 9 which abuts a drain plug 10 that is threadedly secured in the wall 11 of the sump. Sealing ring 9 has a beveled shoulder 12 on its outer end that abuts and sealingly engages an internal taper 13 on the plug 10.

Other than the sealing rings 5 and 9, the screening element 6 comprises an elongated annular screen 14 that is bonded to the seal rings, stringers 15 which extend longitudinally from one sealing ring to the other, and girth rings 16 that are located at intervals between the sealing rings. As shown in the drawings, the sealing rings, stringers, and girth rings are integral with each other and the screen 14 in order to rigidize the element 6 and prevent collapse of the screen during operation. Additional support of the screening element is provided by brackets 17 that are attached at their lower ends to the floor 18 of sump 1 and extend upwardly therefrom to cradle the element in semicircular recesses 19 in their upper ends. The component parts of the screening element can be made from any suitable metal or plastic which, to advantage, is at least substantially nonmagnetic. Brass, aluminum, bronze, alloys of nickle and certain nylons can be used, provided the selected material can withstand temperatures and corrosive effects as might be expected during typical use. Other materials can be used where preferrable and practical.

Figure 3:
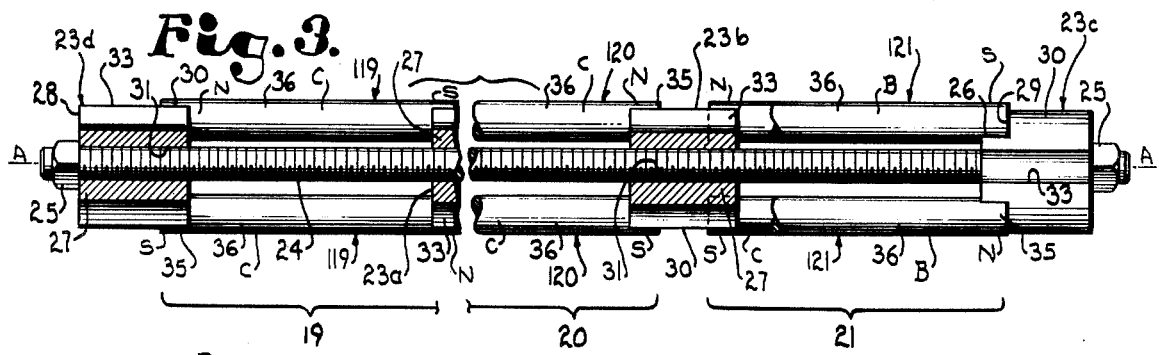
FIG. 3 is a fragmentary elevational view, partially in section, of the magnetic element of FIG. 2, and is shown in the absence of a screening element.
Figure 4:
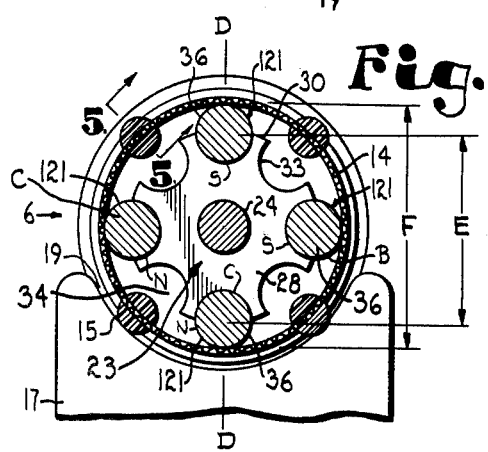
FIG. 4 is a cross-sectional view of the magnetic element taken along line 4—4 of FIG. 2.
Figure 5:
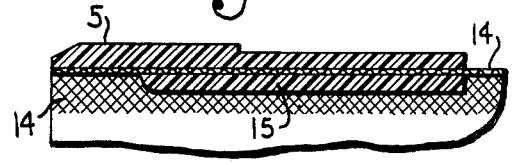
FIG. 5 is a fragmentary elevational view, partially in section, of one end of the screening element taken along line 5—5 of FIG. 4.

Referring to FIGS. 3 and 4, the present magnetic element comprises clusters 19, 20 and 21 of permanent magnets 119, 120 and 121, respectively. Other component parts of the magnetic element include spacer 23 a, b, c, d for the magnets, a threaded spindle 24 on which the spacers are mounted, and nuts 25 that are threadedly engaged on the ends of the spindle. To advantage, the spacers are made of a composition that is at least substantially nonmagnetic, e.g. aluminum, brass, nylon or any other suitably rigid and durable material. The magnets 24 are elongated, i.e. have a length greater than their diameter, and the clusters 19, 20 and 21 are aligned in end-to-end relation to a common longitudinal axis A—A. Each of the magnets of a cluster, such as the four magnets 119 of cluster 19, are spaced apart from each other, are aligned axially in parallel to axis A—A, and are located outwardly from the axis A—A in a radial pattern. Each of the magnets has ends 35 and a longitudinal periphery 36 between the ends that extends in a generally parallel relation to axis A—A.

The spacers 23 have a body portion 27 with ends 28 and a longitudinal periphery 30. The spacers are located along axis A—A at intervals, and the magnets of each cluster abut the spacers and are retentively engaged thereon. As shown in the drawings, inwardly located spacers 23a and 23b receive the ends 35 of magnets in adjacent clusters—thereby abutting the magnets or more than one cluster—whereas the outermost spacers 23c and 23d abut the magnets of only one cluster. The ends 35 of the magnets rest in peripheral recesses 26 that originate at one end 28 of the body portion 27 of the spacer and lead inwardly thereon to a magnet stop 29 against which the ends are abutted. To advantage, the recesses 26 have a depth that is less than the diameter of the magnets, and, accordingly, the magnets can extend radially outward from the periphery 30 of the spacers for contact with the screen 14 of the element 6 along the length thereof.

The spindle 24 extends through axial, central bores 31 in the bodies 27 of the spacers and is part of a clamping means for compressively abutting the spacers against the ends of the magnets so that the magnetic element is caused to be rigidized and the component parts thereof securely held in place. More specifically, as the nuts 25 are tightened on the spindle 24 after the magnets have been placed in the recesses 26 of the spacers as shown in the drawings, the magnets and the spacers are urged toward each other in an axial direction and the ends 35 of the magnets become tightly compressed against magnet stops 29 of the spacers so that they become frictionally secured against the stops and thereby retained within the recesses in the desired radial pattern. Alternatively, the magnets can be secured on the spacers by means of fasteners or cement, and in which case the spacers can be located between the ends of the magnets, if preferred, with longitudinal projection of the ends of the magnets beyond the ends of the spacers. It will be understood that the recesses 26 in the spacers can be omitted and the flat ends 35 of the magnets compressively abutted against the flat ends 28 of the spacers in order to rigidize the element and secure the magnets and spacers in place.

As was previously indicated, one or more or all of the clusters of magnets have a maximum width that is greater than the maximum width of the spacer with which the magnets are abutted. The term "width" as used in this regard is intended to mean a length measurement along a line that perpendicularly intersects the axis A—A. The cluster width is determined by measuring along such a line from the outermost limits of the peripheries 36 of magnets lying on opposite sides of the axis. The spacer width is determined by measuring along such a line from one side to the other of periphery 30 where the cross-section of the spacer is widest. Such a line is represented in FIG. 4 at D—D, with the spacer width being represented by line E and the cluster width by line F.

An advantage in providing a magnet cluster with a width wider than the spacer width is that the magnets project radially outward from the spacer for contacting an annular screening element, such as screen 14, along its length. Since the magnetic lines of force produced by a magnet are strongest nearest its surface, the strongest possible magnetic force can be set up adjacent the screen 14 when the magnets of the clusters are placed flush against it, thereby increasing the ability to draw particles toward the screen and retain them thereon if they cannot pass through its openings. An additional advantage of using a magnet cluster with a width greater than the width of the spacer is that the magnets can be clustered more closely together, i.e. toward axis A—A, for more intense magnetic interaction between the poles of adjacent magnets without seriously impeding the flow of liquid along the element, since lengthwise flow can occur in central cavity 34 of element 6 between the periphery 30 of the spacers and the screen 14.

The body portion 27 of the spacers can include a plurality of channels 33 that extend from one end to the other of the body portion in order to facilitate flow of fluid past the spacers and over the magnets. To advantage, therefore, the channels in the spacers are located adjacent the magnets and are aligned substantially axially in relation to axis A—A. Since in preferred embodiments of the invention the magnets extend radially outward from the periphery 30 of the body 27 of the spacer, the channels 33 can, to additional advantage, be in the form of grooves in the periphery which, as shown in the drawings, are located between the magnets mounted on the spacer. Alternatively or adjunctively, however, the channels in the spacers can be located inwardly of the periphery of the body portion 27, e.g. holes can be drilled through the body portion inwardly of the magnets and outwardly from the bore 31. It will thus be appreciated that the purpose of placing channels in or on the spacers is to facilitate circulation of liquid along the length of the element and to establish a pattern of flow whereby the liquid travels over and between the magnets longitudinally, thus enhancing the probability of contaminant particles being attracted to and retained by the magnets. It should also be pointed out that the spindle 24 serves as a guide or baffle which also helps to direct the flow of liquid away from the center longitudinal center line of the element so that contact with the magnets is further enhanced.

As shown in the drawings, the magnets of the clusters 19, 20 and 21 have their poles oriented to provide an intensified magnetic field effect for magnetic attraction and retention of contaminant particles contained in liquid that is exposed to the element. For example, the end of each magnet in one of the clusters has the same polarity as the nearest end of a magnet in adjacent clusters. More specifically, the north pole of a magnet 119 in cluster 19 is nearest to the north pole of a magnet 120 in cluster 20, and the south pole of a magnet in cluster 20 in nearest to the south pole of a magnet 121 in cluster 21. To additional advantage, the magnets in clusters 19, 20 and 21 are paired and arranged in a substantially evenly spaced radial pattern around axis A—A, with the first magnet of a pair residing on one side of the axis while the second magnet of the pair resides on the opposite side, and with the poles of the first magnet of the pair being oriented to attract the poles of the second magnet of the pair. In the drawings, first and second magnets of pairs are represented at B and C, respectively.

The magnets in clusters 19, 20 and 21 are cylindrical, have the same diameter, and the magnets of one of the clusters are coaxially aligned with those in an adjacent cluster. Accordingly, the sides of the magnets in one cluster are in coplanar relation with the sides of the magnets in an adjacent cluster, and the pole faces of the magnets in one cluster are confrontingly aligned with the pole faces of the magnets in an adjacent cluster. In addition, the ends of the magnets in one cluster are spaced apart longitudinally from the nearest ends of the magnets in an adjacent cluster, i.e. the innermost spacers 23b and 23c have recesses 26 at each end that do not interconnect, and the magnets in the recesses can thus be maintained separated from each other.

Within limits of practicality, any number of magnets can be used in the clusters, and they can have any suitable diameter, length and cross-sectional configuration. It is preferred that the number of magnets in a cluster be a multiple of two, that they be paired as previously described, and have a length that does not exceed about two inches.

When the magnetic element shown in the drawings is inserted axially into the central cavity 34 of the screening element 6, a magnetic filter having advantageous features is thereby provided. The sides of the magnets 119, 120 and 121 contact the nonmagnetic screen and support it from the inside, and strong lines of magnetic force extend outwardly from the screen to pull magnetically attracted particles toward it. Coarser particles cannot pass through the openings of the screen and are retained on the outside by magnetic attraction. Finer particles pass through the openings and adhere to the magnets inside the screen. With the ends of magnets in one cluster having the same (like) polarity as the nearest ends of magnets in an adjacent cluster, the magnetic lines of force in the vicinity of these ends exist in a pattern whereby the ability of the ends to magnetically attract particles to themselves in much less than if the poles were unlike. As a consequence, there is less tendency for the screen to blind over in the vicinity of these unlike poles, thereby helping to preserve patency of the screen during operation.

On the other hand, the previously described orientation of magnets in clusters wherein a magnet on one side of axis A—A attracts the poles of a magnet on the opposite side of the axis creates an intense magnetic field between these magnets inside the screen, and the channels 33 in the spacers help to establish a longitudinal flow in the liquid being cleaned so that it travels over and between the magnets during transit to the suction line 2. Relatively short magnets may be used to advantage since it has been observed that a reduced tendency exists therewith for flaking off of accumulated deposits of magnetically attracted particles.

In operation, liquid to be cleaned of magnetically attracted particles is drawn through screen 14, travels lengthwise therein over the magnets of the element, and passes through the channels 33 of outermost spacer 23d into the lower end 3 of the suction line 2. When the screening and/or magnetic elements require cleaning, the plug 10 is removed and both elements are pulled out of the sump through the threaded opening for the plug. The magnetic element readily slides out of the screening element after both have been removed from the sump, thereby facilitating the cleaning operation. In addition, the magnetic element can be quickly disassembled for thorough cleaning thereof merely by removal of the nuts 25 from the spindle 24. Reassembly of the magnetic element is also straightforward; the spacers are replaced on the spindle, the magnets are reinserted in the spindle recesses, and all parts are thereafter locked in place by reinstalling and tightening the nuts 25 on the spindle.

A magnetic filtering element that fulfills the previously stated objects has now been described in detail, and although it has been described with reference to specific embodiments thereof, it will nonetheless be understood that even other embodiments will become apparent that are within the spirit and scope of the invention defined in the following claims.

What is claimed and desired to secure by Letters Patent is:

1. An elongated magnetic element that is insertable into the central cavity of an annular screening element, said magnetic element comprising:
    a. clusters of elongated magnets, said clusters being aligned in an end-to-end relationship on a common longitudinal axis, the magnets of a cluster being spaced apart from each other, oriented axially in relation to said axis, and located outwardly from said axis in a radial pattern,
    b. spacers that are located along said axis at intervals, the magnets of said cluster being abutted with at least one of said spacers and retentively engaged thereon, and wherein the maximum width of said cluster is greater than the maximum width of the spacer with which the magnets of said cluster are abutted,
    c. said spacers having a body portion with two ends, a periphery that extends around said axis, and said recesses are peripheral recesses that originate at one end of said body portion and lead inwardly thereon.

2. An element as in claim 1 wherein said recesses lead inwardly to a magnet stop on said body portion.

3. An element as in claim 2 wherein said recesses lead inwardly on said body portion from both ends of the body portion.

* * * * *